Sept. 8, 1970     G. G. TAYLOR ET AL     3,527,606
METHOD OF MODIFYING STARCH
Filed March 21, 1968
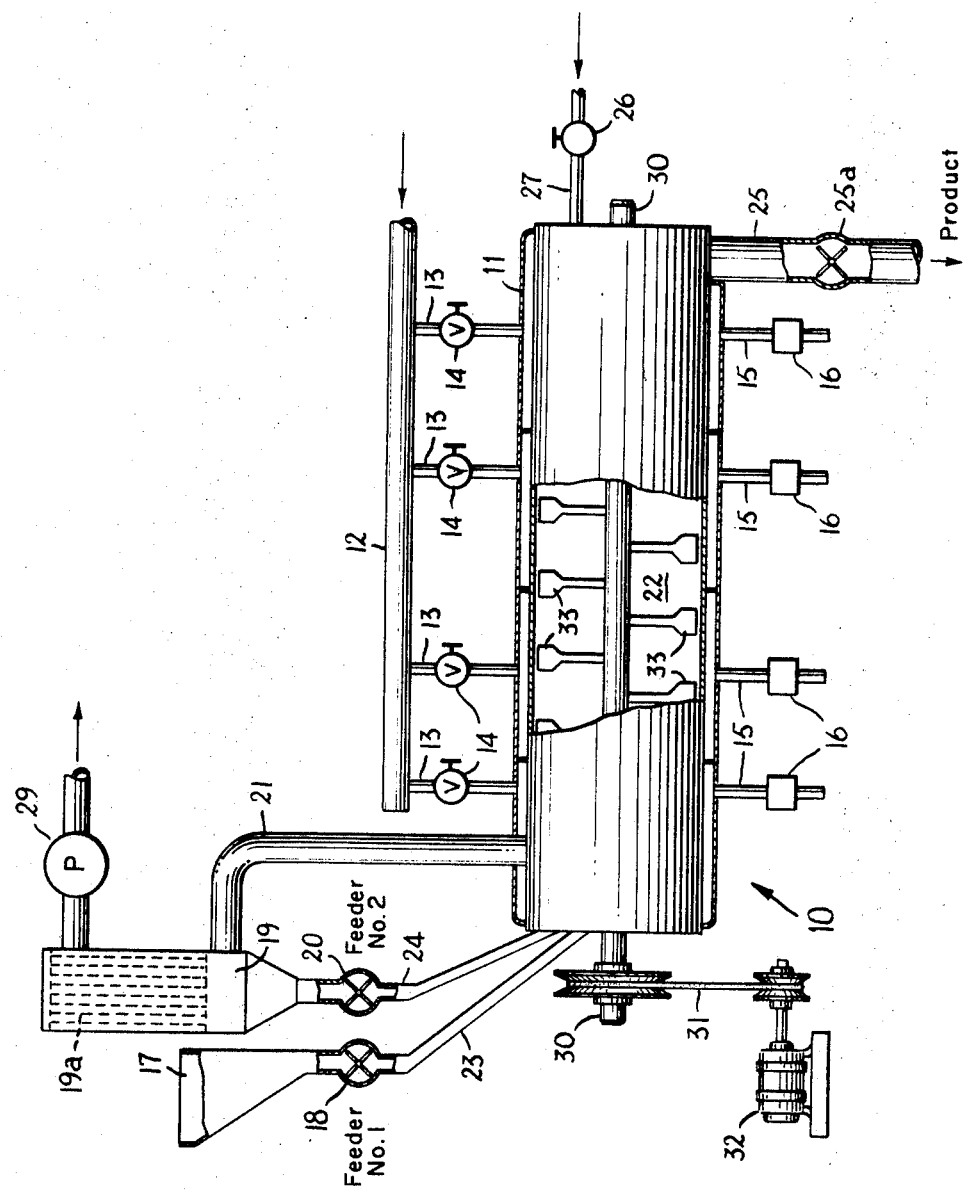
INVENTORS
GERWIN G. TAYLOR &
JULIAN A. HAY
BY
ATTORNEYS 3,527,606
METHOD OF MODIFYING STARCH
Gerwin G. Taylor, Flossmoor, Ill., and Julian A. Hay, Gary, Ind., assignors to American Maize-Products Company, a corporation of Maine
Filed Mar. 21, 1968, Ser. No. 715,090
Int. Cl. C08b *19/06;* C13l *1/08, 1/10*
U.S. Cl. 127—71                                6 Claims

ABSTRACT OF THE DISCLOSURE

A method for modifying starch by either the dry roasting or dry reaction technique consisting of placing particulate starch along with any desired reactant in a cooker and mechanically agitating the starch particles at a rate sufficient to maintain the particles in a turbulized suspension, thereby yielding rate coefficients of heat transfer substantially higher than in prior processes and additionally assuring a uniformity of roast or reaction throughout the entire mass of product.

---

This invention relates to a method for modifying starch, preferably in granular form, by roasting and/or reacting it with another material. In general, the new method results in tremendous improvements over the prior art in the areas of efficiency, increase in overall rate coefficient of heat transfer and uniformity of color of the end product. The invention is considered particularly applicable to the dry roasting and dry reaction techniques for modifying starch. Processes to which this method is applicable are those for manufacturing, in particular, dextrins, British gums, starch phosphate esters, organic esters, ethers and graft polymers of starch by the dry reaction technique. However, the invention is applicable to the broad category of dry reacted or dry roasted starch products and is not limited to the specific examples given above.

Prior methods of dry roasting or reacting dry starch granules with another mateiral utilize either a horizontal or vertical cooker with heated walls. In general, these cookers include either a slow moving agitator or a continuous stream of an inert gas to force starch granules to change position within the cooker relative to each other. The more effective of the two methods in terms of uniform color of the end product and rate coefficient of heat transfer is the method using a continuous stream of gas. This method utilizes the gas by heating it and passing it through a bed of starch granules with a velocity sufficient to suspend the starch granules in the stream of heated gas. This method allows the heated gas to filter through the granule mass suspended in the gas flow, thereby providing fairly uniform heating of the granules. Efficiency of heat transfer between the hot gas and starch granules is quite low and the process has therefore only been used to a limited extent in commerce.

The other method, namely that of using a slow moving agitator within a conventional horizontal cooker with heated walls, has proved unsatisfactory from the standpoint of long reaction time, objectionable color of the end product, and low overall coefficient of heat transfer. This is attributable to the poor distribution of heat throughout the granular mass which increases the processing time and gives localized hot spots in which starch granules tend to be over-heated and over-reacted resulting in poor color and a non-uniform modification of the starch granules.

In contrast, the present invention represents a totally new approach to the modification of starch by either the dry roasting or dry reaction technique. In general, a horizontal cooker is used, but the method is also applicable to vertical cookers. Basically, starch granules and any necessary reactant are fed into the cooker by any conventional means, such as a feed hopper. The desired reactant may be added with the starch granules or added separately through a second feed hopper or sprayed into the cooker as a liquid or gas. The cooker has a jacket through which a heated fluid, liquid or gas is passed to heat the wall of the cooker to the desired temperature for modification of the starch. Inside the cooker there is a plurality of paddles carried on a spindle preferably arranged coaxial with the longitudinal axis of the cooker chamber. The spindle is rotated at rather high speeds to provide vigorous mechanical agitation of the starch particles.

The spindle is rotated to move the paddles through the starch granules at a speed sufficient to maintain the granules in a turbulized suspension within the hollow of the cooker. This condition of turbulized suspension is the result of the centrifugal force which the whirling paddles impart to the individual starch granules which are thereby thrown against the heated wall of the cooker. The granules hit the wall and bounce off to be repeatedly energized by the paddles and maintained in a turbulized suspension in the cooker. The speed of the paddles required to maintain the starch granules in suspension varies depending upon the particular apparatus at hand and upon the quantity of starch granules in the cooker at a given time and upon the moisture content of the starch granules inherently present along with that which may be added by liquid reactants. The desired characteristics in the end product as for example the degree of starch modification will also dictate whether a highly turbulized suspension in the nature of a cyclone is desirable or whether a mildly turbulized condition of suspension with a somewhat longer dwell of individual starch granules in the cooker is most desirable. In some applications particularly where color of the product is not important, beneficial results may be achieved when only a part of the total starch granules are in turbulized suspension while the second part tumbles and rolls along in the bottom of the cooker. In such case there is a constant exchange as suspended granules join the rolling bed of tumbling granules and granules in the bed become energized and suspended in the cooker. The important advantages of the present invention are realized when not less than about one half of the starch granules in the cooker are in turbulized suspension and in our work we prefer to maintain from about eighty-five to one hundred percent of the granules in turbulized suspension for optimum results.

The desired state of turbulized suspension of starch granules during the processing of the starch may be readily determined by examination of conditions within the cooker during operation and the particular condition of turbulized suspension is readily achieved by increasing or decreasing the speed of the whirling paddles. Once the minimum speed for turbulized suspension of the starch granules has been established for a given modification of the starch, the degree of modification may be controlled in known manner by controlling the amount of reactant, temperature and time of reaction. The desired turbulized suspension of starch granules will result when the paddles are rotated through the starch granules at a velocity sufficient to impart a centrifugal force of at least one *g* to any starch granule adjacent the face of any paddle when being pushed by the paddle. It has been found, for reasons not completely understood, that the process is more efficient when using a higher theoretical *g* force than one *g*, preferably at least five *g*'s. However, the theoretical low limit of one *g* is adequate to maintain granules in a state of turbulized suspension. The speed of the paddles required to impart a force of at least one *g* to the starch granules may be calculated in known manner.

The apparatus may be used to process separate batches of starch granules or it may be operated as a continuous process. In a preferred form of apparatus, the cooker is a sealed chamber in which the treatment of the starch may be carried out at superatmospheric pressure or at pressure below that of the atmosphere and suitable arrangement is made for the introduction and withdrawal of air or of a liquid or gaseous reactant under controlled conditions of pressure and rate of flow. In this preferred form of apparatus the starch is introduced and withdrawn from the cooker through conventional air locks. Movement of starch granules through the cooker may be achieved by positioning the cooker chamber at an angle to the horizontal plane in which case gravity causes the suspended granules to move toward the outlet end of the cooker or for more definitive control the paddles may be angled toward the outlet end of the cooker to throw the starch granules toward the outlet in successive increments of travel.

The desired temperature for treatment of the starch granules is controlled by the flow of heated fluid between the jacket and exterior wall of the cooker and preferably the wall temperature is above that required for modification of the starch granules.

While the process is of particular advantage for treating starch granules, it may obviously be used in the treatment of any particulate starch especially when reacted with a gas such as propylene oxide at temperatures above the boiling point of the propylene oxide liquid. In all cases the amount of moisture present in the cooker is maintained below that which may cause the starch granules to stick and agglomerate on the paddles or wall of the cooker.

The volume of starch to total void volume of the cooker was found not to be critical below a ratio of about 1:2, and at higher ratios, the added power necessary to provide the desired turbulence can become prohibitive with a corresponding decrease in efficiency. Although it is possible to use higher ratios, it is preferable that the ratio be kept at or below 1:2.

Furthermore, in keeping with the objects of the present invention, it is preferable that the swept diameter of the paddles be only slightly less than the inside diameter of the cooker chamber, thereby assuring that substantially all the starch granules will be maintained in turbulized suspension with little left in the bottom of the cooker chamber. This greatly assists in avoiding the formation of objectionable color in the end product for reasons to be given hereinafter. However, where color of the end product is not critical, it is permissable to leave as much as 20% or more of the starch granules untouched by the paddles and still get a substantial increase in the rate coefficient of heat transfer over the prior art methods. Therefore, it is contemplated that the invention can also be used in processes where color of the end product is not critical but the user wishes to avail himself of the increased rate coefficient of heat transfer attainable with this method.

The mechanism by which the overall rate coefficient of heat transfer increases is not completely understood at this time. It is thought that the unexpected and surprising increase is due to starch granules striking and bouncing off of the hot wall of the cooker chamber, thereby creating a continuous, yet random interchange of starch granules adjacent the hot wall of the cooker chamber. It is thought that the apparent interchange of starch granules adjacent the hot wall of the cooker chamber promotes more highly efficient heat transfer, since in effect, there is a continuous change of the boundary layer adjacent the hot wall surface. In effect, it is thought that this doesn't allow any one or group of starch granules to remain in contact with the inner wall of the cooker chamber long enough to become as hot as the wall of the cooker chamber, the result of which would be to decrease the rate of heat transfer from the hot wall to the starch granules.

It follows from the above that reaction times will be decreased over the conventional slow agitation method given the same cooker configuration and temperature of fluid within the jacket. Reaction time of the new method of the invention will also be decreased relative to the gas flow method which utilizes the principle of suspending starch granules in a heated stream of gas, given the same volume of starch granules and a gas temperature equal to the temperature of the fluid in the jacket of our invention.

Reaction time can be expressed as a function of overall rate coefficient of heat transfer for a given process. Comparison rate coefficient of heat transfer values were taken for the method of the present invention and for conventional commercial equipment utilizing the slow agitation method and the gas flow method outlined above.

Average values for rate coefficient of heat transfer on successive runs ranged between the 35 and 50 B.t.u./hr./ft.$^2$/°F. for the process of the present invention. Values of rate coefficient of heat transfer for the gas flow and slow agitation processes were 18.6 and 5.3 respectively. The minimum increase in the rate coefficient of heat transfer is about two to one over the gas flow process, thereby indicating the tremendous increase in efficiency of the process of the present invention over the prior art processes. The difference is truly surprising. It is to be understood that the overall rate coefficient of heat transfer is a measure of the rate of reaction attainable with any given equipment. From this it follows that the reaction time necessary in our invention will be shorter than either the gas flow or slow agitation methods under equivalent conditions, thereby providing increased savings in production costs.

The slow agitation method has an advantage over the gas flow method in that users were able to modify starch under vacuum conditions which helped the starch reaction to predominate while suppressing any hydrolytic breakdown of the starch to a reducing sugar. This method also has the advantage of being usable in either continuous or batch type processes. The gas flow method, although giving better results in regard to color, cannot be operated with the efficiency of the present invention, nor is it easily adaptable to continuous operation. Furthermore, since it depends on gas flow to suspend the starch granules, a vacuum cannot be induced in the gas flow method. However, the gas flow method does tend to eleminate water vapor, thereby helping the desired reaction to predominate over the aforementioned hydrolytic breakdown reaction. The present invention combines both these features. The reaction can take place under vacuum conditions and it is also possible to pass air or an inert gas through the cooker to remove water vapor, thereby reducing the partial pressure of the water vapor and inhibiting the hydrolytic breakdown reaction which is highly detrimental in starch phosphate reactions. If desired, a gas or liquid reactant may be sprayed into the cooker.

Another highly important feature of the present invention is the color of the end product. For reasons discussed before in relation to rate coefficient of heat transfer, the slow agitation method tends to produce objectionable color in the product because of the slow interchange of starch granules between the heat transfer surface and the mass of starch granules within the cooker. Some parts of the mass of starch granules become over-reacted while some parts remain under-reacted. Since color in the end product is a function of the time each granule is reacted and temperature at which it is reacted, it follows that any non-uniformity in heating of the starch granules tends to produce objectionable color in the end product. The present invention alleviates this problem. In the turbulized suspension, each granule, by random exposure to the heating surface, gets reacted, statistically, for the same amount of time and at the same temperature as every other granule, thereby assuring uniformity of heat treatment and lack of objectionable color in the product never before attainable with an agitation process.

Further specific details of the present invention may be readily understood by reference to the drawing which illustrates one preferred form of apparatus and in which:

FIG. 1 is a schematic drawing of a cooker designed in accordance with the foregoing description.

The cooker 10 as shown is a horizontal cooker having a partitioned jacket 11 for zoned heating. The cooker 10 is positioned at a slight angle to the horizontal plane to tilt down toward the outlet end of the cooker so that gravity will move the starch particles toward the outlet for discharge after the desired modification is completed. Positioned above the partitioned jacket 11 is a fluid pipe 12 which is tapped at four places to receive feeder stems 13, the number of stems and tapped holes in the fluid pipe preferably being equal to the number of partitions in the jacket. This number can vary from one to as many as the user desires and is not limited to four. In each stem there is a control valve 14 to control the amount of heating fluid, preferably steam or oil, that is allowed to enter each partition in the jacket. Each control valve 14 is controllable independently of the others. This gives the advantageous result of being able to partially cool the reacted starch particles by selectively closing one or more of the control valves 14 before the starch product leaves the cooker. Similarly, the starch product may also be fully cooled while in the cooker chamber simply by supplying a cooling fluid to fluid pipe 12 after the reaction has been completed as in a batch operation.

Underneath the cooker are four outlet stems 15, one for each partition in the jacket. The outlet stems will be as many in number as there are partitions in the jacket and should be equal to the number of inlet pipes 13. However, it is not necessary to provide one outlet stem for each inlet stem as it is completely feasible to use two or more outlet stems for each inlet stem. Each outlet stem has a condensation trap 16 attached thereto to remove condensate from the existing steam. The outlet stems can be connected back to the source of heating (not shown) so that the steam can be recirculated through the inlet stems after reheating.

The cooker is fed by feed hopper 17, the feed rate being controlled by a conventional variable speed air lock 18. A second feeder 19 is also provided for feeding fines and dust collected in a conventional dust collector 19a. The feed rate of feeder 19 is regulated by a variable speed air lock 20. Feeder 19 is connected to the cooker chamber through an exhaust pipe 21 which also serves as an air flow duct in a manner to be hereinafter described.

Feed hopper 17 and feeder 19 feed their charge through variable speed air locks 18 and 20 into the cooker chamber 22 through feed pipes 23 and 24. Longitudinally displaced from the point at which feed pipes 23 and 24 enter the cooker chamber 22 and disposed at an end of said cooker chamber is an outlet 25 which has a variable speed air lock 25a which serves to controllably remove reacted product from within the cooker chamber. Disposed above the output feeder 25 is a fluid control valve 26 in the feed line 27 connected to the cooker chamber 22. The fluid control valve 26 regulates the amount of fluid, preferably air, or liquid or gaseous reactant which is fed into the cooker chamber 22. Connected to the exhaust pipe 21 is a vapor pump 29 which is effective to pull fluid admitted to the cooker chamber 22 through the fluid control valve 26, through the cooker chamber 22 and out of the cooker chamber via pipe 21 and then through the dust collector 19a which removes entrapped fines and dust, and finally through the vapor pump 29 to exhaust to the atmosphere. The speed at which the vapor pump 29 operates will determine the pressure or vacuum inside the cooker and preferably the vapor pump is capable of sustaining a vacuum of at least 15 inches mercury within the cooker chamber 22. When operating under pressure, the fluid may be fed under superatmospheric pressure to control valve 26 or pulled into the cooker by exhaust pump 29. Allowing fluid to pass through the cooker chamber in combination with the feature of being able to reduce the pressure inside the cooker chamber enhances the operational flexibility so that the cooker may be used for reactions in which either superatmospheric pressure or less than atmospheric pressure is necessary as a proper condition for the reaction.

Disposed within the cooker chamber 22 is a spindle 30. The spindle 30 is coaxial with the longitudinal axis of the cooker chamber 22 and is of a length greater than the axial length of the cooker chamber. Opposite ends 30 of the spindle extend past the ends of cooker chamber 22 and ride in bearing supports (not shown). Connected to one end of the spindle 30 is a belt 31. The belt is in turn connected to a drive motor 32 which is effective to drive the belt 31 and spindle 30 at the desired speed to maintain the starch particles in turbulized suspension.

Attached to spindle 30 are a plurality of paddles 33. The paddles 33 can be integrally made with the spindle or separately made and individually connected. The paddles are preferably oriented in a manner such that the projected length of each paddle face multiplied by the number of paddles is substantially equal to the greatest measured longitudinal distance between the first and last paddle. This assures that the paddles will have sufficient face area to turbulize the starch granules within the cooker. The paddles may be mounted with their faces at an angle to the longitudinal axis of the cooker chamber so as to give a directional impetus to the starch granules in addition to the induced centrifugal force, thereby tending to force the starch granules towards the outlet end of the cooker chamber. In the form of structure shown there are two rows of paddles set one hundred and eighty degrees apart, but this is not critical and the paddles may be arranged in any desired manner on the spindle.

The embodiment of the invention, as described, lends itself well to different reactions. For instance, in the production of hydroxypropyl starch, it is preferable to evacuate air from the cooker chamber before the introduction of propylene oxide in order to reduce the hazard of an explosion. This is easily done by utilizing the vapor pump 29 and the fluid control value 26. In this instance, the fluid control valve 26 is closed and the vapor pump operated to evacuate the cooker chamber 22. Fluid control valve 26 is then opened and nitrogen is introduced through the fluid control valve until the pressure in the chamber returns to 15 p.s.i.g. The cooker chamber is then purged of the nitrogen and propylene oxide is sprayed into the chamber through valve 26. Inside the heated chamber the liquid turns to gas and a sufficient quantity of liquid is added to bring the pressure inside the cooker up to about 15 p.s.i.g. The starch granules are maintained in turbulized suspension by rotation of the paddles and the temperature of the granules are then raised to 160° F. by allowing steam to flow into the partitioned jacket 11 through the control valves 14. As the reaction proceeds and the propylene oxide reacts with the suspended starch granules, the pressure in the cooker chamber drops. As the pressure drops, propylene oxide is continuously added to the cooker chamber through fluid control valve 26 to maintain the desired pressure of 15 p.s.i.g. within the cooker chamber. The same process is followed for the manufacture of hydroxyethyl starch.

In contrast to the above reaction, the starch phosphate or dextrin reactions require that the process be carried out under either vacuum conditions or conditions in which an inert gas is pulled through the cooker chamber. The desirability of these conditions stems from the fact that water vapor generated by the reaction tends to promote hydrolytic breakdown of the starch granules to a reducing sugar. It has been found that passing a given volume of air or some other inert gas through the cooker chamber tends to remove the generated water vapor and accelerate the dextrinization or phosphorylation reaction, while de-accelerating the hydrolytic breakdown reaction. The same is true of carrying out the reaction under vacuum conditions. The instant invention is adaptable to either method or a combination of both. For instance, if it were desirable to carry out the reaction under vacuum conditions, the fluid control valve 26 is closed and the vapor pump 29 operated. If it were desired to carry out the reaction by passing a volume of inert gas through the cooker chamber, the vapor pump 29 is operated to the extent necessary to remove that volume of inert gas introduced per unit time into the cooker chamber through fluid control valve 26. If it were desired to carry out the reaction under partial vacuum conditions only while still passing a volume of gas through the cooker chamber, the vapor pump 29 is operated at a rate sufficient to remove a greater volume of gas than that introduced into the cooker chamber through fluid control valve 26.

Additionally, the cooker is suitable for use in either a continuous or batch process. In continuous process operation, starch, having been pretreated where necessary, is fed to the cooker chamber 22 through feed hopper 17. Variable speed air lock 18 is set to control the feed rate of starch into the cooker chamber 22. Outlet feeder 25 is activated and controlled as to the amount of product removed from the cooker chamber. At this point, steam is allowed to enter pipe 12 and the control valves 14 are set to the desired steam input to the partitioned jacket 11. Drive motor 32 is then activated, which drives the spindle 30 and in turn the attached paddles 33 to maintain the starch granules in a turbulized suspension within the cooker chamber. Any collected dust is then fed back into the cooker chamber 22 at a controlled rate by variable air lock 20.

In a batch process, operation is similar to the continuous process except that the output feeder 25 is not activated until the desired reaction has been completed.

It is therefore evident that the particular embodiment of the invention is highly versatile and susceptible of many uses.

The following examples illustrate some of the known starch modification reactions which may be carried out with advantage by the process of the present invention. In the examples, the cooker shown in the drawing had a 16 inch inside diameter and a void volume of 14 cubic feet. The sweep diameter of the paddles was approximately 15½ inches. The cooker chamber was half filled with about 245 pounds of starch granules giving a starch to void volume ratio of 1:2 where the ratio is defined to be the volume of starch granules within the cooker chamber divided by the total void volume of the empty cooker chamber. Heat was supplied by high pressure steam in the jacket of the cooker and the temperature of the starch granules inside the cooker was recorded by means of a conventional thermocouple (not shown). In terms of peripheral velocity of the paddles, for the equipment and dimensions given the practical upper limit was found to be about 2,000 feet per minute which corresponds to a theoretical $g$ level of about fifty-two for ordinary commercial starch granules.

EXAMPLE I

In this example ordinary commercial corn starch granules containing approximately 10% moisture were fed into the cooker as described above and the spindle was rotated at 160 r.p.m. to maintain the granules in turbulized suspension for two and one quarter hours while maintaining the temperature of the granules at 355° F.

The dry roasting converted the starch to a British gum having the following solubility and viscosity measured with a conventional Cold Funnel Viscosity Test on a paste containing one part of roasted granules to two parts of water.

| Time Hours | Solubility, percent | Viscosity, (ml.) |
|---|---|---|
| 1.0 | 30 | 8 |
| 1.5 | 59 | 21 |
| 2.0 | 72 | 34 |
| 2.25 | 77 | 38 |

EXAMPLE II

In this example high amylose starch granules catalyzed with 1.5% sodium carbonate and containing about 12% moisture were charged to the cooker. Air was then purged from the cooker with nitrogen gas as hereinabove described and then liquid propylene oxide was introduced into the heated cooker where it vaporized to a gas. The propylene oxide was continuously fed to the cooker to maintain the pressure inside at 15 p.s.i.g. The spindle was rotated at 400 r.p.m. to maintain the granules in turbulized suspension and the temperature of the starch granules was held at 160° F. The reaction with propylene oxide was continued for six hours with the following results.

| Time, hrs. | Cooker pressure (p.s.i.g.) | Amount propylene oxide (ml.) | Percent treatment |
|---|---|---|---|
| 0.00 | 2 in. Hg. | 0 | 0 |
| 0.20 | 15 | 2,900 | 0 |
| 0.33 | 15 | 3,200 | 0.54 |
| 0.75 | 15 | 3,600 | 1.27 |
| 2.00 | 15 | 5,000 | 3.80 |
| 2.75 | 15 | 6,100 | 5.80 |
| 3.50 | 15 | 7,100 | 7.60 |
| 4.25 | 15 | 8,100 | 9.40 |
| 4.75 | 15 | 9,050 | 11.10 |
| 5.25 | 15 | 10,000 | 12.87 |
| 6.00 | 15 | 10,800 | 14.30 |

EXAMPLE III

In this example the cooker was charged with starch granules impregnated with 8% sodium phosphate. The granules had a total moisture content of 11.8% by weight. The spindle was rotated at 160 r.p.m. to maintain the starch granules in turbulized suspension. Air was passed through the cooker to carry away the moisture liberated from the starch granules. The air was exhausted from the cooker by the pump 27 as described hereinabove.

| Time, min. | Starch temp. in cooker, °F. | Air flow, c.f.m. through cooker | Paste temp., °F. | Viscosity, cps. |
|---|---|---|---|---|
| 0 | 150 | 5 | | |
| 15 | 315 | 5 | | |
| 30 | 330 | 5 | 130 | |
| 45 | 335 | 5 | 110 | |
| 60 | 335 | 5 | Cold water soluble | |
| 75 | 335 | 5 | | 3,000 |
| 90 | 335 | 5 | | 4,000 |
| 105 | 335 | 5 | | 3,500 |
| 120 | 335 | 5 | | 9,000 |

Viscosity of the product was measured with a conventional Brookfield Viscosimeter at 6 r.p.m., No. 4 spindle.

At the end of 120 minutes, starch granules impregnated with 8% sodium phosphate are continuously fed and removed from the cooker through the air locks at the rate of about 400 pounds per hour in order to convert from batch to continuous operation.

It will be understood that the appended claims are intended to cover the many uses and modifications of the preferred embodiment which do not constitute departures from the spirit and scope of the invention.

What is claimed is:

1. The process of modifying starch in particulate form in a cooker chamber which comprises the steps of mechanically agitating the starch to form a turbulized suspension of starch particles within the said chamber, maintaining starch particles in a turbulized suspension by subjecting them to a centrifugal force of at least about 1g, and impacting said starch particles against the wall of the chamber to effect heat transfer betwen said particles and said wall to effect modification thereof, and thereafter discharging starch particles from said chamber.

2. The process specified in claim 1 which includes the step of introducing a fluid reactant into the cooker.

3. The process specified in claim 1 which includes the step of passing an inert gas through the cooker to assist in the removal of vapor generated by heating the starch particles.

4. The process specified in claim 1 which includes the step of heating the starch particles at a pressure less than atmospheric pressure.

5. The process specified in claim 1 which includes the step of heating the starch particles under a pressure greater than atmospheric pressure.

6. The process specified in claim 1 in which the ratio of starch particles to total void volume of the cooker is 1:2.

References Cited

UNITED STATES PATENTS

| | | | |
|---|---|---|---|
| 2,180,968 | 11/1939 | Schorn | 127—23 |
| 2,274,789 | 3/1942 | Horesi | 127—38 |
| 2,845,368 | 7/1958 | Fredrickson | 127—23 X |
| 3,317,514 | 5/1967 | Fox | 260—233.5 |
| 3,399,200 | 8/1968 | Hay | 260—233.5 |

MORRIS O. WOLK, Primary Examiner

S. MARANTZ, Assistant Examiner

U.S. Cl. X.R.

127—28, 38; 260—233.3, 233.5